United States Patent [19]

Braukmann

[11] 4,027,852

[45] June 7, 1977

[54] VALVE DISC AND SEAT CONSTRUCTION

[76] Inventor: Bernhard W. Braukmann, Am. Posenbag 1, D-695 Mosbach, Germany

[22] Filed: Mar. 27, 1974

[21] Appl. No.: 455,174

[30] Foreign Application Priority Data

Mar. 29, 1973 Germany .......................... 2315626

[52] U.S. Cl. ................................ 251/333; 251/339
[51] Int. Cl.² ............................................ F16K 1/34
[58] Field of Search ......... 251/333, 356, 357, 339, 251/325; 137/625.33, 625.38, 625.35

[56] References Cited

UNITED STATES PATENTS

| 3,089,677 | 5/1963 | Savaria ....................... 251/325 X |
| 3,585,813 | 6/1971 | Hansen ....................... 251/61.3 X |
| 3,729,025 | 4/1973 | Silverstrini ................... 137/625.33 |

FOREIGN PATENTS OR APPLICATIONS 375,857   5/1927   France .......................... 251/357

Primary Examiner—Arnold Rosenthal
Attorney, Agent, or Firm—William T. Howell

[57] ABSTRACT

A valve seat and/or co-operating disc has an indented or zigzag perimeter. The disc is integral with the valve body and surrounds a body aperture through which a sealed valve stem reciprocates.

2 Claims, 6 Drawing Figures

VALVE DISC AND SEAT CONSTRUCTION

FIELD OF INVENTION

This invention relates to a valve seat and disc construction.

PRIOR ART

In valve disc and seat construction it is known that the capacity of a round seat and co-operating disc may be increased by enlarging the valve seat and disc but this involves enlarging the valve body which in many cases is undesirable.

SUMMARY OF THE INVENTION

It is an object of the invention to provide increased capacity in a given valve body containing a valve seat and co-operating disc this is accomplished by constructing the valve disc and or co-operating valve seat with an indented or zigzag border whereby the contacting edge is longer than would be the case if the valve disc or seat was round. In particular the border of the disc or seat may be contoured in what is known as a vitruvian scroll. With such a design the passageway for the fluid will be longer than if the edge was round and the capacity will be increased because of the enlarged flow area. One advantage of this design where incorporated into control valves is that the power needed for operation is less than in the conventional round design. Also, it has been found that the accuracy is greater and the capacity much better than in the hitherto known round design.

BRIEF DESCRIPTION OF THE DRAWINGS:

The invention will now be described in relation to the corresponding drawings in which.

DESCRIPTION OF THE EMBODIMENTS

Figure 1:
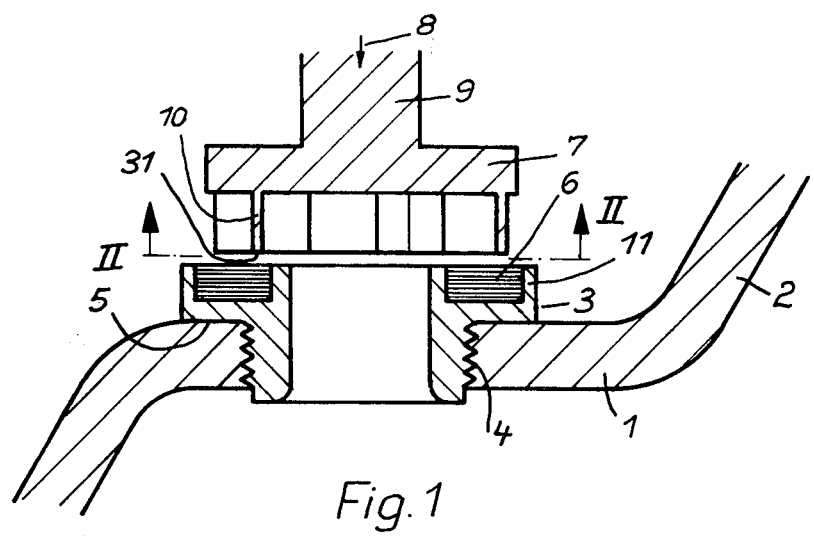
FIG. 1 is a vertical section through one embodiment of a valve seat and disc constructed according to the invention.

Referring more particularly now to FIG. 1, the horizontally disposed part 1 of a valve body wall 2 carries a valve seat 3 which may be provided with threads 4 to permit it to be secured in position as a replacement item into the valve body wall 2. The connection between the valve seat 3 and the valve body 2 may be sealed by a gasket or other means not shown, but in the result the lower side 5 of the valve seat 3 bears against the upper surface of the horizontally disposed part of the valve body 2. The upper surface of the valve seat 3 incorporates a durable composition ring 6.

Figure 2:
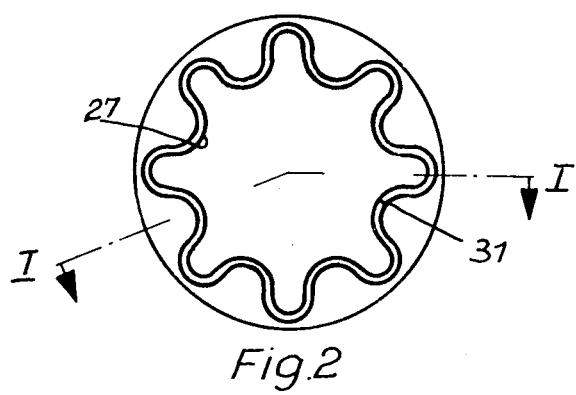
FIG. 2 is a view of the valve disc of FIG. 1, taken on the lines II — II of FIG. 1.

A valve disc 7 moveable towards and away from the valve seat 3 along the line of the arrow VIII is shown in the view FIG. 2, to have a disc contour which is indented or may be otherwise described as a zigzag formation. This contour enlarges the length of the disc or border considerably in comparison with a round contour.

It will be appreciated that the valve disc 7 does not have to be in one piece with the valve stem 9.

Figure 3:
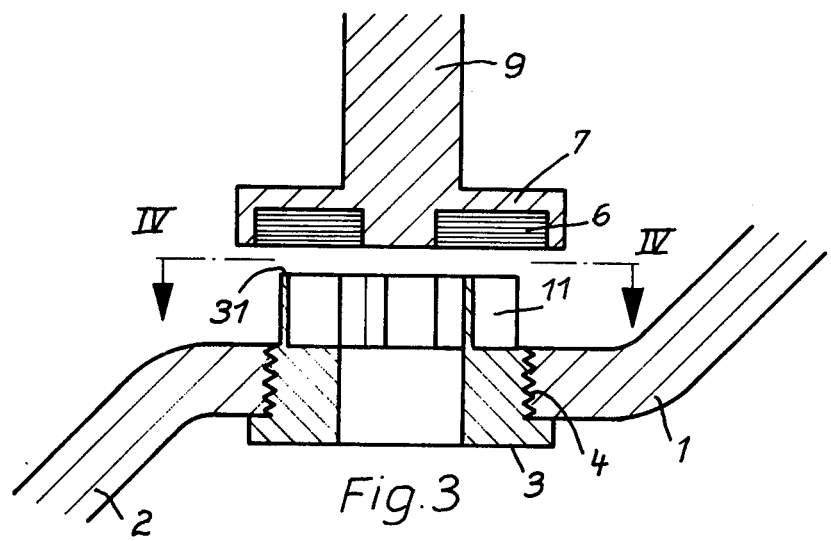
FIG. 3 is a vertical section through a further embodiment of a valve seat and disc constructed according to the invention.
Figure 4:
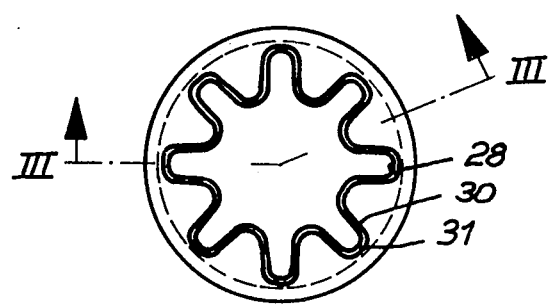
FIG. 4 is a view of the valve seat of FIG. 3, taken on the lines III — III of FIG. 3.

The further embodiment illustrated in FIGS. 3 and 4 shows a durable composition ring 6 located in a round valve disc 7 which bears against a valve seat 3 having a border 11 with the configuration already described in relation to FIG. 2.

Figure 5:
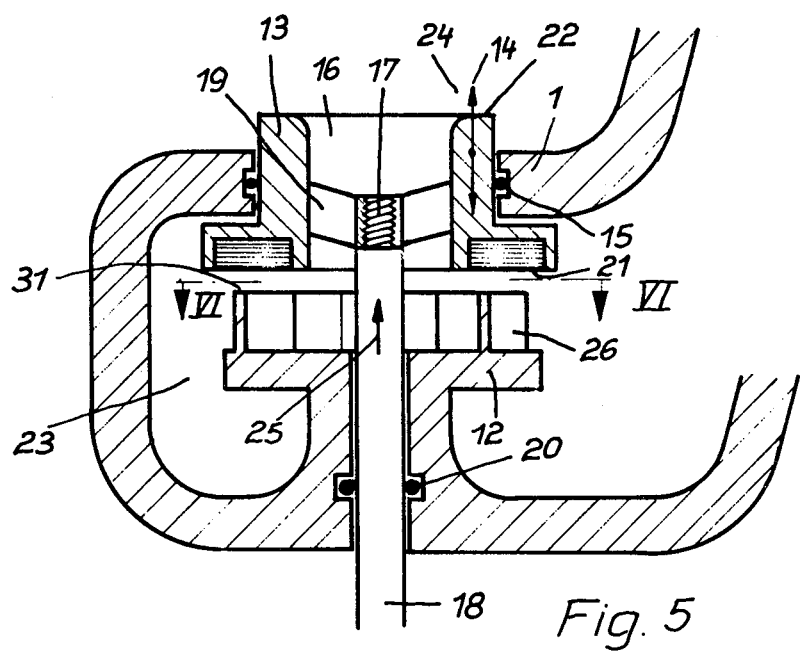
FIG. 5 shows a vertical section through another embodiment of a valve seat and disc constructed according to the invention.
Figure 6:
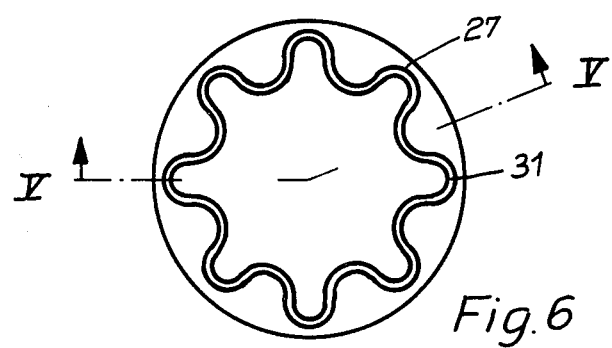
FIG. 6 is a view of the valve disc shown in FIG. 5, taken along the lines VI — VI of FIG. 5.

The embodiment of FIGS. 5 – 6 illustrates a valve disc 12 with an indented border of the nature already described but incorporated as one piece with the valve body 1. The valve seat 13 of this embodiment is axially movable in the valve body part 1 in the direction of the arrow 14. The valve seat 13 through ribs 19 is in threaded connection at 17 with a stem 18 and the valve seat 13 has an "O" ring 15 which provides a seal with a valve body part 1. The valve stem 18 is also in sealing contact with a valve body part 1 through another "O" ring 20. It will be appreciated that in this construction the valve seat may be moved by mechanical, hydraulic or electric controls.

It is to be understood that in this construction arrangement may be made so that the valve seat 13 can be turned e.g. by a longitudinal slot or keyway. The shape of the disc border, i.e. the inside edge 27 of the valve disc 7 and 12 respectively, as well as the corresponding outside edge 29 is designed as an uninterrupted piece in a general round form. The same consideration applies to the border of the valve seat 3 shown in FIGS. 3 and 4, i.e. the inside edge 28 and the outside edge 30. It is also envisaged that both the valve seat and valve disc can be designed in the same way as a zigzag formed so that on contact their edges coincide.

What is claimed is:

1. A valve comprising a valve body having a first aperture, a first seal in said first aperture, a valve disc integral with said valve body and surrounding said first aperture, a movable stem in said first aperture engaging said first seal, a second aperture in said valve body opposed to said first aperture, a second seal in said said second aperture, a valve element in said second aperture engagable with second seal, said movable stem being attached to said valve element to move the latter into contact with said valve disc and away therefrom, one of said valve disc and said valve element having a raised zig zag surface forming a seat.

2. A valve according to claim 1 wherein said valve disc has said raised zig zag surface and said valve element has an inset of harder material which contacts said zig zag surface.

* * * * *